United States Patent
Cho et al.

(10) Patent No.: US 8,743,808 B2
(45) Date of Patent: Jun. 3, 2014

(54) COLLISION REDUCTION IN A CSMA/CA SYSTEM

(75) Inventors: James S. Cho, Mountain View, CA (US); Shiwei Zhao, Union City, CA (US)

(73) Assignee: QUALCOMM Atheros, Inc., San Jose, CA (US)

( * ) Notice: Subject to any disclaimer, the term of this patent is extended or adjusted under 35 U.S.C. 154(b) by 410 days.

(21) Appl. No.: 13/269,823

(22) Filed: Oct. 10, 2011

(65) Prior Publication Data

US 2013/0089036 A1 Apr. 11, 2013

(51) Int. Cl.
*H04W 4/00* (2009.01)

(52) U.S. Cl.
USPC ........................................... 370/329

(58) Field of Classification Search
None
See application file for complete search history.

(56) References Cited

U.S. PATENT DOCUMENTS

| | | | |
|---|---|---|---|
| 2006/0221879 A1* | 10/2006 | Nakajima et al. | 370/310 |
| 2006/0268886 A1 | 11/2006 | Sammour et al. | |
| 2007/0171933 A1* | 7/2007 | Sammour et al. | 370/447 |
| 2009/0252110 A1* | 10/2009 | Sridhara et al. | 370/330 |
| 2010/0091644 A1 | 4/2010 | Chen | |

OTHER PUBLICATIONS

International Search Report and Written Opinion—PCT/US2012/059502—ISA/EPO—Dec. 19, 2012.

* cited by examiner

*Primary Examiner* — John Blanton
(74) *Attorney, Agent, or Firm* — Bay Area Technology Law Group PC

(57) ABSTRACT

Method for reducing collisions between a first station and a second station in a CSMA/CA system. The method may be performed by the first station. Medium access to transmit to the second station may be obtained according to a first procedure for obtaining medium access. It may be determined that the second station is configured to grant transmit opportunity to the first station. Medium access to transmit to the second station may be obtained according to a second procedure for obtaining medium access based on determining that the second station is configured to grant transmit opportunity to the first station. The first procedure may include contending for medium access, while the second procedure may include delaying contention for medium access relative to the first procedure.

18 Claims, 4 Drawing Sheets

COLLISION REDUCTION IN A CSMA/CA SYSTEM

BACKGROUND

1. Field of the Disclosure

The present invention relates generally to Carrier Sense Multiple Access with Collision Avoidance (CSMA/CA) communication systems, and more particularly to a system and method for reducing collisions in a CSMA/CA context.

2. Description of the Related Art

Multiple access communication systems are used any time more than two stations utilize a common medium for communication. There are many types of multiple access schemes; for example, some multiple access schemes include frequency division multiple access, time division multiple access, code division multiple access, and carrier sense multiple access (CSMA) schemes, such as CSMA with collision detection (CSMA/CD), and CSMA with collision avoidance (CSMA/CA).

CSMA schemes typically require a station that desires to use the medium to communicate to attempt to detect (to "sense") whether another station is currently using the medium. If another station (a "carrier") is sensed, the station will typically wait for the other station's communication to finish before attempting to communicate on the medium.

However, if for one reason or another (e.g., if multiple stations were waiting for another station's transmission to finish to attempt to transmit using the medium) multiple stations attempt to transmit on the medium simultaneously, then a collision occurs, and it is possible that neither attempt to communicate will be successful. Thus, CSMA/CD and CSMA/CA have been developed as refinements of the basic CSMA concept in order to reduce the impact of and/or avoid collisions; one or the other may be more appropriate in various contexts, e.g., depending on the type of medium.

As one example, the 802.11 protocol (WLAN) for wireless communication, also referred to as WiFi, is designed as a CSMA/CA system. Despite the collision avoidance techniques built into the CSMA/CA system, collisions can still occur relatively easily with the WiFi contention process. Furthermore, as the number of stations contending for medium access at a given time increases, so does the probability of a collision. In addition, due to the wireless nature of the medium in WiFi, there is no straightforward way to tell whether packet collisions happened at a receiver, even for a receiver itself. Accordingly, improvements in the field would be desirable.

SUMMARY OF THE DISCLOSURE

Embodiments of the disclosure are presented in order to reduce collisions in a CSMA/CA system. More specifically, embodiments of the disclosure are directed at modifying medium access procedures based on the availability of transmit opportunity grants. For example, if a first station is configured to receive transmit opportunity grants from a second station during the second station's transmit opportunity, the first station may advantageously delay or avoid contending for medium access in order to transmit to the second station. The first station may delay or avoid contending for medium access (to communicate with the second station) in favor of waiting for a transmit opportunity grant from the second station. This thereby reduces the likelihood that a collision will occur as a result of the first station contending for medium access.

Embodiments of the disclosure accordingly include a method for reducing collisions between a first station and a second station, and a system configured to implement the method. In some embodiments, the system configured to implement the method may be the first station. The first station may include a port for communicating with other stations and control logic coupled to the port and configured to implement the method. In some embodiments the port may be a wireless port, e.g., including an antenna (or multiple antennas) for wirelessly transmitting and receiving signals. Furthermore, embodiments are envisioned in which the control logic includes one or more processors and a memory medium including program instructions executable by the one or more processors to implement the method. Other types of control logic, and other types of ports (e.g., wired ports) are also envisioned. The method may be performed as follows.

Medium access to transmit to the second station may be obtained according to a first procedure for obtaining medium access. The first procedure may include contending for medium access, e.g., including use of a backoff counter/timer in a manner typical of CSMA/CA based protocols. The first procedure may be used to obtain medium access to transmit to the second station in the absence of any reverse direction protocol between the first station and the second station.

It may be determined that the second station is configured to grant transmit opportunity to the first station. For example, the first station may receive a reverse direction grant (RDG) from the second station, and may determine based on receiving the RDG from the second station that the second station is configured to grant transmit opportunity to the first station. As another possibility, the first station and the second station may exchange configuration information indicating that the second station is configured to grant transmit opportunity to the first station; for example, the second station may send a message to the first station indicating that the second station is configured as a grantor of transmit opportunity, and/or the first station may send a message to the second station indicating that the first station is configured to be capable of accepting/responding to transmit opportunity grants. Other means of determining that the second station is configured to grant transmit opportunity to the first station are also considered.

Medium access to transmit to the second station may be obtained according to a second procedure for obtaining medium access, based on determining that the second station is configured to grant transmit opportunity to the first station. The second procedure may include delaying contention for medium access relative to the first procedure. In other words, because the first station has determined that the second station may grant transmit opportunity to the first station, the first station may be less aggressive in contending for medium access in order to transmit to the second station.

The second procedure may thus differ from the first procedure in one or more ways. For example, as noted above, the first procedure may in some embodiments include using a backoff counter as part of medium contention. The value of the backoff counter may be randomly selected to be between a first number and a second number, in order to avoid collisions with other stations contending for medium access. The second procedure, then might use a backoff counter with a value randomly selected to be between the first number and a third number, where the third number is higher than the second number. Alternatively, the second procedure might include inserting a delay period (i.e., waiting for a period of time) before initiating a backoff counter with a value randomly selected to be between the first number and the second number. A further embodiment is considered in which the second procedure includes using a backoff counter with a value randomly selected to be between a third number and a fourth number, where the third number is higher than the first number and the fourth number is higher than the second number. Additionally, or as an alternative to using a modified backoff counter, the second procedure may include resetting the backoff counter if the second station grants transmit opportunity to the first station (e.g., after the backoff counter has initiated but before it has completed). In some embodiments, the second procedure for obtaining medium access may include not contending for medium access at all, but rather may include simply waiting for the second station to grant transmit opportunity to the first station.

In some embodiments, the first station may also be configured to communicate with a third station. Embodiments are considered in which the first station is configured to obtain medium access to transmit to the third station according to the first procedure (e.g., a procedure for obtaining medium access in the absence of reverse direction capability between the first and third stations), while also being configured to obtain medium access to transmit to the second station according to the second procedure (e.g., a procedure for obtaining medium access in the presence of reverse direction capability between the first and second stations). In other words, the first station may be configured to obtain medium access according to different procedures in order to transmit to different stations, depending on the presence or absence of reverse direction capability between the first station and the respective stations.

In some embodiments, the stations may communicate wirelessly via the 802.11 (WLAN) protocol, and the transmit opportunity grants discussed above may include reverse direction grants (RDGs) according to the 802.11 protocol. However, alternate types of transmit opportunity grants (e.g., according to other protocols) are also considered.

BRIEF DESCRIPTION OF THE DRAWINGS

A better understanding of the present invention can be obtained when the following Detailed Description of the Embodiments is read in conjunction with the following drawings, in which.

Figure 1:
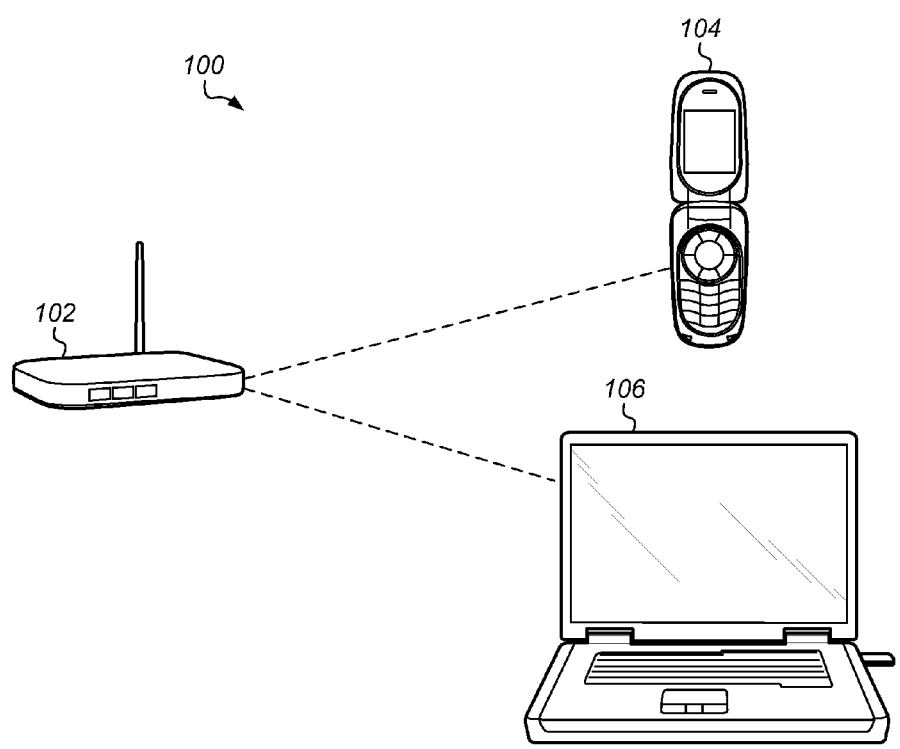
FIG. 1 illustrates exemplary communication links between devices, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE DISCLOSURE

Terms

The following is a glossary of terms used in the present application:

Memory Medium—Any of various types of memory devices or storage devices. The terms "memory" and "memory medium" are intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as flash memory, hardware registers, a magnetic media (e.g., a hard drive), or optical storage. The memory medium may comprise other types of memory as well, or combinations thereof. The term "memory medium" may include two or more memory mediums.

Computer System—Any of various types of mobile or stationary computing or processing systems, including a personal computer system (PC), mainframe computer system, workstation, network appliance, Internet appliance, mobile phone, smart phone, laptop, notebook, netbook, or tablet computer system, personal digital assistant (PDA), multimedia device, or other device or combinations of devices. In general, the term "computer system" can be broadly defined to encompass any device (or combination of devices) having at least one processor that executes instructions from a memory medium.

Wireless Link—A wireless communicative coupling between two devices (which may be referred to as "wireless devices"). A wireless link may be established via any of a variety of wireless communication protocols, including any of various versions of IEEE 802.11 (WLAN), Bluetooth, Wibree, wireless USB, ZigBee, or any of various cellular network protocols, among others.

Access-Point Device—As used herein, an access-point device (or station) is considered a device that allows another device to establish a communicative coupling (e.g., wireless and/or wired) with the access-point device. According to some communicative protocols, an access point device may be required to be specifically configured to be an access point device, while other communicative protocols may allow any device configured according to that protocol to act as an access-point device.

FIG. 1

Embodiments of the disclosure relate to reducing collisions in CSMA/CA systems. FIG. 1 illustrates an exemplary system 100 including wireless links between wireless devices 102, 104, 106, which may be configured to implement embodiments of this disclosure. The wireless links may enable wireless communication between wireless devices 102, 104, 106 according to any of a variety of wireless communication technologies. In one exemplary implementation, the wireless links may be established as part of an IEEE 802.11 (WLAN) network. For example, wireless device 102 is shown as a router, and may act as a gateway-type device (i.e., an access point transceiver). Thus in such an embodiment, any WLAN enabled wireless devices within communicative range, such as mobile phone 104 or laptop computer 106 (or both), may establish a WLAN wireless link with router 102 to join the WLAN network.

In other envisioned embodiments, the wireless links may be established according to any of a variety of other wireless communication protocols. For example, any wireless communication protocol that utilizes CSMA/CA techniques may be suitable to provide wireless links according to the principles of the disclosure.

Furthermore, while the illustrated embodiment shows links specifically between router 102 and mobile phone 104, and router 102 and laptop 106, it should be noted that, in various embodiments, wireless links may be between any of a wide variety of suitable wireless devices, which may include, without limitation, mobile phones (including smart phones); tablet, netbook, notebook, laptop, and/or desktop computers; personal digital assistants; multimedia players (portable or stationary); routers, hubs, and/or other gateway type devices; and/or other mobile devices/computing systems which are operable to use wireless communication. In particular, it should be noted that while in some embodiments wireless links may need to be established through a gateway-type device (such as router 102), other embodiments are envisioned in which any wireless device may wirelessly communicate directly with any other wireless device (e.g., in which a wireless link directly between mobile phone 104 and laptop computer 106 could also be established).

While FIG. 1 illustrates an exemplary wireless communication system (e.g., in which stations communicate via a wireless medium), embodiments are also considered in which the communication medium is wired. For example, in some embodiments there may be wired connections between router 102, mobile phone 104, and laptop 106, and/or between other devices.

The devices (stations) shown in FIG. 1 may be configured to implement embodiments of the disclosure. For example, according to some embodiments, mobile phone 104 or laptop 106 might communicate using a CSMA/CA multiple access scheme (e.g., such as 802.11) in a manner that reduces collisions by increasing use of transmission opportunity grants and/or modifying backoff behavior based on the possibility of receiving transmission opportunity grants, such as according to an embodiment of the method described with respect to FIG. 4.

FIG. 2

Figure 2:
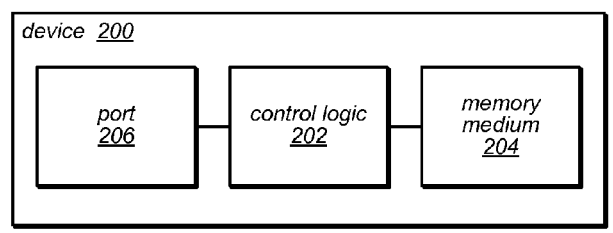
FIG. 2 is a block diagram of an exemplary device according to one embodiment.

FIG. 2 is a simplified block diagram illustrating various components of a device which is capable of establishing a communicative link with another device according to various embodiments of the disclosure.

FIG. 2 illustrates a device 200 which includes control logic 202, and a memory medium 204. The control logic 202 may be implemented using any of various types of logic, such as analog logic, digital logic, a processor (such as a CPU, DSP, microcontroller, etc.), an ASIC (application specific integrated circuit), an FPGA (field programmable gate array), or any combination of the above.

The memory medium 204 may store program instructions executable by the control logic 202 to perform one or more aspects of the methods disclosed herein, and/or perform other device functionality. The device 200 may be any of a variety of types of device, and may implement any of a variety of functionalities, according to various embodiments. For example, device 200 may be a mobile phone (such as mobile phone 104 shown in FIG. 1) or smart phone, a laptop (such as laptop 106 shown in FIG. 1) or other computer, a router (such as router 102 shown in FIG. 1) or generally any other type of device which may be used to communicate in a wired or wireless manner according to CSMA/CA techniques. According to some embodiments, the device 200 may act as an access-point transceiver implementing one or more wireless protocols. Alternatively, embodiments are considered in which the device 200 may act as a client device (implementing one or more wireless protocols) to an access-point transceiver.

The device 200 may also include a port 206. The device 200 may utilize the port 206 in order to form communicative links to other devices. In some embodiments, the port 206 may be a wireless port, and may include an antenna for transmitting and/or receiving signals wirelessly. Alternatively, the port 206 may be a wired port, e.g., for transmitting and/or receiving signals in a wired manner.

In one embodiment, the port 206 may be implemented as part of a wireless adapter which implements one or more wireless protocols. In one example, port 206 may be included in a WLAN adapter in device 200. In other embodiments, port 206 may be included in a wireless adapter implementing another wireless protocol. A wireless adapter housing port 206 may include circuitry configured to implement the wireless protocol(s). For example, as noted above, the port may include an antenna; in addition, a wireless adapter housing the port might also include a receive buffer (e.g., to buffer received signals until they can be processed by device 200), control logic, and/or other possible components. Embodiments are also envisioned in which the port 206 includes multiple antennas (e.g., for MIMO and/or for implementing multiple wireless protocols).

As will be understood by those of skill in the art in light of this disclosure, device 200 may also include any of a variety of other components as desired, e.g., for implementing other device functionality. Such components are not shown in order to avoid obscuring details of the disclosure.

FIG. 3

Transmission Control Protocol (TCP) and User Datagram Protocol (UDP) are the two most commonly used protocols for data exchange between IP-based network stations. TCP aims to provide reliable, ordered delivery of a stream of bytes from one program on a computer to one program on another computer; accordingly, it involves data transmission from source to destination and acknowledgement from destination to source. Dual-direction traffic thus is always involved in TCP transmission.

As a result, with TCP traffic, there are always collisions happening in a half-duplex contention based communication system such as a CSMA/CA system. For example, in 802.11 (WLAN/Wi-Fi), based on the standardized contention window and backoff behavior, at least 11% collision rate is expected in a single-link TCP transmission. In other words, there is still significant room for improvement in collision reduction in CSMA/CA systems, in particular with respect to data exchange mechanisms that include significant dual-directional traffic, such as (but not limited to) TCP.

802.11n defines a medium access control (MAC) protocol called Reverse Direction (RD) protocol. According to the RD protocol, an RD initiating station may grant the remainder of an otherwise underutilized transmit opportunity (TXOP) to a station that indicates that it is capable of acting as an RD responder. The intention of this Reverse Direction Grant (RDG) is to allow the owner of an underutilized TXOP to sublease the remainder of the TXOP to its peer in case of asymmetric traffic pattern (e.g., when its peer has mostly short frame traffic, such as TCP Acknowledgment (ACK) packets generated by a TCP responder). The overhead associated with the contention period and the short frame exchange at the beginning of the TXOP may thus be largely reduced and MAC efficiency could be significantly improved.

Figure 3:
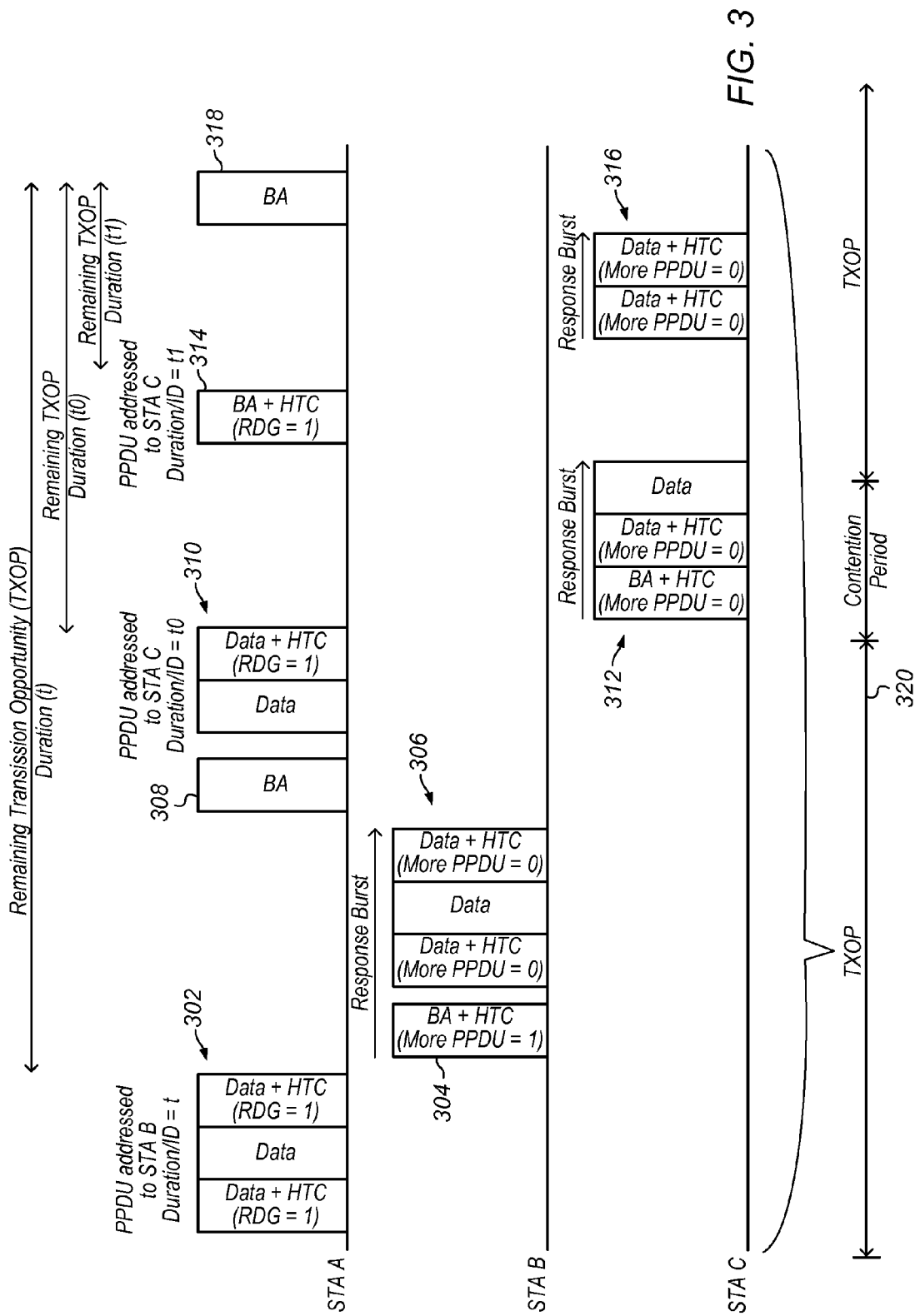
FIG. 3 is a timing diagram illustrating the use of transmit opportunity grants between devices according to one embodiment.

FIG. 3 is a timing diagram illustrating an exemplary sequence of transmissions including RDGs. The transmissions illustrated in FIG. 3 may be performed between devices (e.g., any of wireless devices 102, 104, or 106 shown in FIG. 1, or other devices). The specific illustrated example shown in FIG. 3 may take place in an 802.11/WLAN implementation (e.g., according to the RD protocol) according to one embodiment. However, it should be noted that other CSMA/CA systems may also advantageously implement transmit opportunity grants, in particular according to the principles of this disclosure in order to reduce the frequency of collisions in such a system. The exemplary sequence of transmissions shown in FIG. 3 and described below with respect thereto should accordingly be considered as an example of one possible way of implementing transmit opportunity grants in a CSMA/CA system, and should not be considered limiting to the disclosure as a whole.

In the illustrated example, Station A (STA A) may have acquired a transmit opportunity. In some embodiments, station A may have acquired the transmit opportunity via the standard 802.11 medium contention/backoff procedure. Station A may initially transmit frames 302 to Station B (STA B). The frames 302 may include data for Station B; in addition, the HTC "RDG" field may be set to 1, with a duration/ID of t (where t is the duration of the remaining transmission opportunity). This may indicate to Station B that Station A is granting transmit opportunity (i.e., a reverse direction grant) of duration t to Station B.

Station B may accordingly transmit a response burst to Station A. As shown, the response burst may include a batch acknowledgement (BA) frame 304, with the HTC "more PPDU" field set to 1, to indicate that more data is to follow. Station B may then transmit data frames 306 to Station A, now with the HTC "more PPDU" field set to 0 to indicate that Station B has finished its transmission.

Station A may transmit a BA frame 308 to Station B. Station A may then transmit data frames 310 to Station C (STA C); in addition, the HTC "RDG" field may be set to 1, with a duration/ID of t0 (where t0 is the duration of the remaining transmission opportunity). This may indicate to Station C that Station A is granting transmit opportunity of duration t0 to Station C.

Station C may then transmit a response burst 312 to Station A. As shown, the response burst 312 may include a batch acknowledgement (BA) frame, and two data frames, with the HTC "more PPDU" field set to 0, to indicate that no more data is to follow.

Station A may transmit a BA frame 314 to Station C, in which again the HTC "RDG" field may be set to 1, this time with a duration/ID of t1 (where t1 is the duration of the remaining transmission opportunity). This may indicate to Station C that Station A is granting further transmit opportunity of duration t1 to Station C.

Station C may accordingly use the granted transmit opportunity to transmit two data frames 316 to Station A, with the HTC "more PPDU" field again set to 0 to indicate that no more data is to follow.

Station A may transmit a BA 318 to Station C to acknowledge receipt of the data frames. This may conclude Station A's transmission opportunity. As shown in timeline 320, in some embodiments, a contention period may follow, which may in turn be followed by another transmission opportunity. Depending on which station acquires the next transmission opportunity (e.g., depending on whether the acquiring station is configured to grant transmit opportunity), additional transmit opportunity grants may be given in the course of that transmission opportunity as well.

Clearly, the concept of granting unused transmit opportunity to another station capable of acting as an RD responder has the potential to increase the efficiency of data communication (e.g., by allowing other stations to make use of transmit opportunity which might otherwise go unused). For example, in the transmission opportunity shown in FIG. 3, if Station A did not grant its unused transmission opportunity to Stations B and C, a significant portion of the transmission opportunity would go unused, and no communication would be made during this unused transmission opportunity.

Furthermore, transmission opportunity grants may be further encouraged by modifying contention behavior of RD responding stations to reduce competition for transmission opportunity in contention periods. This in turn may reduce the probability of collisions, while still efficiently allowing all stations to transmit data to other stations as needed. The flowchart of FIG. 4 and the description provided with respect thereto describe various embodiments of such a method for reducing the frequency of collisions by modifying contention behavior of stations which are configured to receive transmit opportunity grants.

FIG. 4

Figure 4:
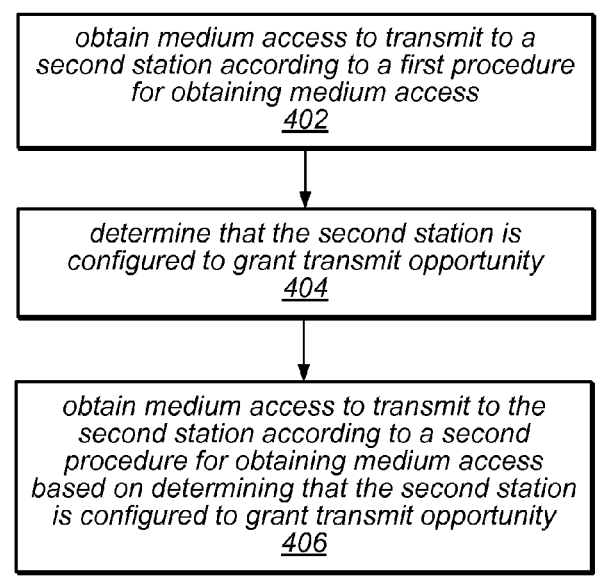
FIG. 4 is a flowchart diagram illustrating embodiments of a method for reducing collisions between stations in a CSMA/CA system.

FIG. 4 is a flowchart diagram illustrating embodiments of a method for reducing collisions in a CSMA/CA system. More specifically, embodiments of the disclosure are directed at modifying medium access procedures based on the availability of transmit opportunity grants. For example, if a first station is configured to receive transmit opportunity grants from a second station during the second station's transmit opportunity, the first station may advantageously delay or avoid contending for medium access in favor of waiting for a transmit opportunity grant, thereby reducing the likelihood that a collision will occur as a result of the first station contending for medium access.

Embodiments of the methods may be implemented by a first station. For example, the method of FIG. 4 may typically be implemented by any of the devices of FIGS. 1-2 of this disclosure. Thus, the first station may include a port for communicating with other stations and control logic coupled to the port and configured to implement the method. In some embodiments the port may be a wireless port, e.g., including an antenna (or multiple antennas) for wirelessly transmitting and receiving signals. Furthermore, embodiments are envisioned in which the control logic includes one or more processors and a memory medium including program instructions executable by the one or more processors to implement the method.

In a preferred embodiment, the CSMA/CA context may be an 802.11 (WLAN) network with an access point station (such as router 102 shown in FIG. 1) and one or more client stations (such as mobile phone 104 and laptop 106). In this scenario, the first station (configured to be a "reverse direction responder" such as Stations B and C shown in FIG. 3) may preferably be one of the client stations, while the second station (configured to be a "reverse direction initiator" such as Station A shown in FIG. 3) may be the access point station. However, the method may be implemented in other CSMA/CA contexts (or other arrangements in an 802.11 context) according to some embodiments.

While the steps described below with respect to FIG. 4 are shown in a certain order, it should be noted that, according to various embodiments, one or more of the steps may be omitted, repeated, or performed in a different order than shown. One or more additional steps may also or alternatively be added, as desired. The method may be performed as follows.

At step 402, medium access to transmit to the second station may be obtained according to a first procedure for obtaining medium access. In some embodiments, the first procedure may include contending for medium access. A typical first procedure that includes contending for medium access might include first detecting whether the medium is free (e.g., whether or not another device is currently making use of the medium). If another device is using the medium, the first procedure may include waiting until the medium is free. Once the medium is free, a backoff counter may be initiated. The backoff counter may have a value that is randomly (or pseudo randomly) determined to be between a first number and a second number. For example, in some embodiments, a standard "contention window" might be between 0-15. The station may wait until the backoff counter has run down, and if no station is using the medium to communicate at that time, the station may attempt to use the medium. If no collision occurs, the attempt to communicate using the medium may be successful and the station may thereby acquire a transmission opportunity.

The intention of waiting out a random backoff period is to reduce the likelihood of collisions between stations contending for medium access. For example, if two devices are contending for medium access, and each randomly selects a backoff period to be within the contention window, it is relatively unlikely that both will choose the same backoff period. Thus, as the device with the shorter backoff period attempts to communicate using the medium, the device with the longer backoff period will detect that the medium is in use, and will wait for the next contention period to try again to gain medium access.

It should be noted that a variety of possible contention windows are possible. In some embodiments, a station's contention window may depend on a priority level of the data to be transmitted. For example, a station desiring to transmit high priority data (such as video or voice data with stringent quality of service (QoS) requirements) may have a smaller contention window, such as 0-7, while low priority data may have a larger contention window, such as 0-31.

At step 404, it may be determined that the second station is configured to grant transmit opportunity to the first station. As noted above, the result of a contention period in a CSMA/CA system may be that one station acquires a transmission opportunity. A transmission opportunity may, in some embodiments, have a defined length of time before the station having use of the communication medium must relinquish the medium. If a station acquires a transmission opportunity, but does not use the entirety of the transmission opportunity, that station may (e.g., if capable of doing so) grant or offer a portion of its transmission opportunity to another station (e.g., a station capable of receiving or accepting such a grant or offer). Thus, as used herein, a "transmission opportunity grant" is considered to be a negotiated use of a portion of one station's transmission opportunity by another station in a way that does not require medium contention by the station receiving the transmission opportunity grant. A reverse direction grant (RDG), such as defined in the 802.11 based reverse direction protocol and described above with respect to the timing diagram shown in FIG. 3, would be one example of a transmission opportunity grant.

That the second station is configured to grant transmit opportunity to the first station may be determined in any of a variety of ways. In some embodiments, when establishing a communicative link between the first station and the second station (e.g., over the shared medium), various configuration information may be exchanged. Such configuration information might, for example, include information relating to various capabilities and characteristics of each station. Among such capabilities and characteristics, a station's capability (or incapability) of granting or receiving transmission opportunity grants might be identified. Thus, in some embodiments the first station may determine that the second station is configured to grant transmit opportunity to the first station based on receiving a message (e.g., the second station's configuration information) indicating that the second station is configured to grant transmit opportunity to the first station and/or transmitting a message (e.g., the first station's configuration information) indicating that the first station is configured to receive transmit opportunity grants.

Alternatively, in some embodiments, the second station may simply attempt to grant transmit opportunity to the first station (e.g., without knowledge of whether the first station is capable of accepting transmit opportunity grants). If the first station is capable of accepting transmit opportunity grants, the first station may use the transmit opportunity grant, and may further determine (e.g., based on actually having received a transmit opportunity grant from the second station) that the second station is configured to grant transmit opportunity to the first station. Other means of determining that the second station is configured to grant transmit opportunity to the first station are also considered.

At step 406, medium access to transmit to the second station may be obtained according to a second procedure for obtaining medium access, based on determining that the second station is configured to grant transmit opportunity to the first station. The second procedure may differ from the first procedure in one or more ways. Generally speaking, the second procedure may include delaying contention for medium access relative to the first procedure. In other words, because the first station has determined that the second station may grant transmit opportunity to the first station, the first station may be less aggressive in contending for medium access in order to transmit to the second station.

For example, as noted above, the first procedure may in some embodiments include using a backoff counter as part of medium contention. In some embodiments, the second procedure may also involve using a backoff counter as part of medium contention. However, while the value of the backoff counter may be randomly selected to be between a first number and a second number in the first procedure, the value of the backoff counter may be randomly selected to be between the first number and a third number in the second procedure, where the third number is higher than the second number. For example, embodiments are considered in which according to the first procedure, the backoff counter may be between 0-15, while according to the second procedure, the backoff counter may be between 0-51. Thus in this case, the backoff counter has a greater chance of having a higher value in the second procedure than in the first procedure. In other words, there is a higher probability of a longer wait before attempting to acquire medium access according to the second procedure for obtaining medium access, effectively delaying contention under the second procedure relative to the first procedure.

In another set of embodiments, the second procedure might include inserting a delay period (i.e., waiting for a period of time) before initiating a backoff counter with a value randomly selected to be between the first number and the second number. Thus in this case, the second procedure may include literally delaying the contention process relative to the first procedure.

In a further set of embodiments, second procedure might include using a backoff counter with a value randomly selected to be between a third number and a fourth number, where the third number is higher than the first number and the fourth number is higher than the second number. This may, in some embodiments, effectively be a combination of the above described methods for delaying contention relative to the first procedure. For example, if the third number is higher than the first number, this may be equivalent to delaying for a length of time (i.e., the value of the third number minus the value of the first number) before beginning the contention window begins. Similarly, if the fourth number is higher than the second number, this increases the probability, according to the second procedure in relation to the first procedure, of a longer wait before attempting to obtain medium access.

Embodiments are also envisioned in which the contention window (i.e., the range of values from which the backoff counter is selected) may be dynamically modified. For example, if the first station is not obtaining sufficient transmit opportunity for its desired transmissions to the second station, the first station may modify the contention window to decrease the contention delay relative to the first procedure. On the other hand, if the first station is obtaining sufficient transmit opportunity via transmission opportunity grants, the first station may increase the contention delay of the second procedure relative to the first procedure, in order to further reduce the probability of collisions occurring.

It will be noted that according to the embodiments described above, the second procedure may not always result in a longer backoff period than the first procedure. For example, if the first procedure includes randomly selecting a number between 0-15, and the second procedure includes randomly selecting a number between 0-51, the first procedure could select 14 while the second procedure selects 4. Thus in individual cases, an attempt to contend for medium access according to the second procedure may not be delayed relative to the first procedure. This may of course be desirable, e.g., in order that a station using the second procedure to obtain medium access may still acquire transmission opportunity if transmission opportunity grants are not sufficient for the station's transmission desires.

However, in this case the second procedure will produce a backoff period which is higher on average than the first procedure. For the purpose of this disclosure, then, the second procedure may be considered to delay contention for medium access relative to the first procedure if the second procedure results in a higher probability of a longer wait before attempting to acquire medium access than the first procedure, even if the second procedure does not literally result in a longer wait before attempting to acquire medium access than the first procedure every time it is performed.

A further possible component of the second procedure may, in some embodiments, include resetting the backoff counter if the second station grants transmit opportunity to the first station (e.g., after the backoff counter has initiated but before it has completed). For example, if the first station desires to transmit to the second station, the first station may initiate the second procedure for obtaining medium access, which may include determining a value of a backoff counter such as described above according to various possible embodiments. In some embodiments, if another station acquires medium access before the first station's backoff counter has run down, the backoff counter may typically pause while the medium is in use, and resume once a new contention period begins. However, if it is the second station that has acquired medium access, and during the transmission opportunity acquired by the second station, the second station grants transmission opportunity to the first station, the first station may reset the backoff counter. In other words, the first station may select a new random value according to its contention window the next time the first station desires to transmit to the second station, rather than continuing to count down the previous backoff counter.

It should be noted that according to some embodiments, the second procedure may include the first station using a modified backoff counter relative to the first procedure (e.g., such as described above) in combination with resetting the backoff counter if the second station grants transmit opportunity to the first station. Alternatively, the second procedure may include the first station using the same backoff counter as used in the first procedure, and the only modification of the second procedure relative to the first procedure may be that the backoff counter is reset if the second station grants transmit opportunity to the first station.

Additionally, in some embodiments, the second procedure for obtaining medium access may include not contending for medium access at all in order to transmit to the second station. In such embodiments, the first station may simply wait for the second station to grant transmit opportunity to the first station in order to transmit to the second station. It should be noted that in this case, it is envisioned that the first station may still contend for medium access under some circumstances; for example, if the first station wishes to transmit to a third station, which is not configured to grant transmission opportunity to the first station, the first station may contend for medium access in order to transmit to the third station. The first station may, in some embodiments, not use the acquired transmission opportunity to transmit to the second station; alternatively, in some embodiments, the first station may use the acquired transmission opportunity to transmit to the second station, e.g., if there is additional transmit opportunity available after the desired transmission to the third station is complete.

It should be noted that other differences between the first procedure and the second procedure, in addition to or as alternatives to those described above, are also considered.

More generally, embodiments are considered in which the first station may also be configured to communicate with a third station, and in which different medium access acquisition procedures are used to obtain medium access to transmit to the second station and the third station, in particular if the second station is configured to grant transmit opportunity to the first station and the third station is not configured to grant transmit opportunity to the first station. In such embodiments, the first station may be configured to obtain medium access to transmit to the third station according to the first procedure (e.g., a procedure for obtaining medium access in the absence of transmit opportunity grants from the third to the first station), while at the same time being configured to obtain medium access to transmit to the second station according to the second procedure (e.g., a procedure for obtaining medium access in the presence of transmit opportunity grants from the second to the first station). In other words, the first station may be configured to obtain medium access according to different procedures in order to transmit to different stations, depending on the presence or absence of reverse direction capability between the first station and the respective stations.

Embodiments are also considered in which the first station may communicate with additional stations using the shared medium. The first station may generally be configured to use either of the first or second procedures for obtaining medium access to communicate with a respective station depending on whether or not the respective station is configured to grant transmission opportunities to the first station.

It should also be noted that embodiments are envisioned in which other stations may also be configured to receive transmit opportunity grants from the second station. In particular, if communication over the shared medium is primarily performed via an access point station (such as router 102 shown in FIG. 1), it may be advantageous if the access point station is a grantor of transmit opportunities, and each of the client stations is configured to receive transmit opportunity grants. In this case, the access point may typically have a higher likelihood of obtaining medium access in contention than the client stations (e.g., because the client stations may use the second procedure, which may delay attempts to contend for medium access relative to the first procedure, while the access point station may use the first procedure). The access point may accordingly acquire transmission opportunity via contention more often than the client stations, but because the access point may grant spare transmission opportunity to the client stations, the client stations may still typically obtain sufficient transmission opportunity for their needs.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for reducing collisions between a first station and a second station in a CSMA/CA system, wherein the method is performed by the first station, the method comprising:
  obtaining medium access to transmit to the second station according to a first procedure for obtaining medium access;
  determining that the second station is configured to grant transmit opportunity to the first station;
  obtaining medium access to transmit to the second station according to a second procedure for obtaining medium access based on determining that the second station is configured to grant transmit opportunity to the first station;
  wherein the first procedure comprises contending for medium access, wherein the second procedure comprises delaying contention for medium access relative to the first procedure.

2. The method of claim 1,
  wherein the first procedure comprises using a backoff counter with a value randomly selected to be between a first number and a second number in order to avoid collisions;
  wherein the second procedure comprises using a backoff counter with a value randomly selected to be between the first number and a third number in order to avoid collisions, wherein the third number is higher than the second number.

3. The method of claim 1,
  wherein the first procedure comprises using a backoff counter with a value randomly selected to be between a first number and a second number in order to avoid collisions;
  wherein the second procedure comprises waiting a delay period then using the backoff counter with the value randomly selected to be between the first number and the second number in order to avoid collisions.

4. The method of claim 1,
  wherein the first procedure comprises using a backoff counter with a value randomly selected to be between a first number and a second number in order to avoid collisions;
  wherein the second procedure comprises using a backoff counter with a value randomly selected to be between the third number and a fourth number in order to avoid collisions, wherein the third number is higher than the first number and the fourth number is higher than the second number.

5. The method of claim 1,
  wherein the first procedure comprises using a backoff counter with a value randomly selected to be between a first number and a second number in order to avoid collisions;
  wherein the second procedure comprises using a backoff counter with a value randomly selected to be between the first number and the second number in order to avoid collisions, wherein the second procedure further comprises resetting the backoff counter if the second station grants transmit opportunity to the first station.

6. The method of claim 1,
  wherein the first procedure comprises using a backoff counter with a value randomly selected to be between a first number and a second number in order to avoid collisions;
  wherein the second procedure comprises using a backoff counter with a value randomly selected to be between a third number and a fourth number in order to avoid collisions, wherein the third number is higher than the first number and/or the fourth number is higher than the second number, wherein the second procedure further comprises resetting the backoff counter if the second station grants transmit opportunity to the first station.

7. The method of claim 1, the method further comprising:
  obtaining medium access to transmit to a third station according to the first procedure for obtaining medium access, wherein the third station is not configured to grant transmit opportunity to the first station.

8. The method of claim 1,
  wherein the second procedure comprises not contending for medium access, wherein obtaining medium access according to the second procedure comprises waiting for the second station to grant transmit opportunity to the first station.

9. The method of claim 1, the method further comprising:
  receiving a reverse direction grant (RDG) from the second station;
  wherein determining that the second station is configured to grant transmit opportunity to the station is based on receiving the RDG from the second station.

10. A first station configured to reduce collisions in a CSMA/CA system, the first station comprising:
  a port for communicating with other stations;
  a processor; and
  a memory medium, wherein the memory medium comprises program instructions executable by the processor to:
  obtain medium access to transmit to a second station according to a first procedure for obtaining medium access;
  determine that the second station is configured to grant transmit opportunity to the station;
  obtain medium access to transmit to the second station according to a second procedure for obtaining medium access based on determining that the second station is configured to grant transmit opportunity to the first station;
  wherein the first procedure comprises contending for medium access, wherein the second procedure comprises delaying contention for medium access relative to the first procedure.

11. The first station of claim 10,
  wherein the first procedure comprises using a backoff counter with a value randomly selected to be between a first number and a second number in order to avoid collisions;

wherein the second procedure comprises using a backoff counter with a value randomly selected to be between the first number and a third number in order to avoid collisions, wherein the third number is higher than the second number.

12. The first station of claim 10,
wherein the first procedure comprises using a backoff counter with a value randomly selected to be between a first number and a second number in order to avoid collisions;
wherein the second procedure comprises waiting a delay period then using the backoff counter with the value randomly selected to be between the first number and the second number in order to avoid collisions.

13. The first station of claim 10,
wherein the first procedure comprises using a backoff counter with a value randomly selected to be between a first number and a second number in order to avoid collisions;
wherein the second procedure comprises using a backoff counter with a value randomly selected to be between the third number and a fourth number in order to avoid collisions, wherein the third number is higher than the first number and the fourth number is higher than the second number.

14. The first station of claim 10,
wherein the first procedure comprises using a backoff counter with a value randomly selected to be between a first number and a second number in order to avoid collisions;
wherein the second procedure also comprises using the backoff counter, wherein the second procedure further comprises resetting the backoff counter if the second station grants transmit opportunity to the first station.

15. The first station of claim 10,
wherein the first procedure comprises using a backoff counter with a value randomly selected to be between a first number and a second number in order to avoid collisions;
wherein the second procedure comprises using a backoff counter with a value randomly selected to be between a third number and a fourth number in order to avoid collisions, wherein the third number is higher than the first number and/or the fourth number is higher than the second number, wherein the second procedure further comprises resetting the backoff counter if the second station grants transmit opportunity to the first station.

16. The first station of claim 10,
wherein the second procedure comprises not contending for medium access, wherein obtaining medium access according to the second procedure comprises waiting for the second station to grant transmit opportunity to the first station.

17. The first station of claim 10, wherein the program instructions are further executable by the processor to:
receive a reverse direction grant (RDG) from the second station via the port;
determine that the second station is configured to grant transmit opportunity to the station based on receiving the RDG from the second station.

18. The first station of claim 10,
wherein the port is a wireless port for communicating wirelessly with other stations, wherein the port comprises an antenna for transmitting and receiving wireless signals.

\* \* \* \* \*

UNITED STATES PATENT AND TRADEMARK OFFICE
CERTIFICATE OF CORRECTION

| | | |
|---|---|---|
| PATENT NO. | : 8,743,808 B2 | Page 1 of 1 |
| APPLICATION NO. | : 13/269823 | |
| DATED | : June 3, 2014 | |
| INVENTOR(S) | : James S. Cho et al. | |

It is certified that error appears in the above-identified patent and that said Letters Patent is hereby corrected as shown below:

On the Title Page
Item (73) Assignee should read: Qualcomm Incorporated, San Diego, CA (US)

Signed and Sealed this
Fourteenth Day of October, 2014

Michelle K. Lee
*Deputy Director of the United States Patent and Trademark Office*